United States Patent [19]

Krenzer

[11] E Patent Number: Re. 32,047

[45] Reissued Date of Patent: Dec. 17, 1985

[54] PROCESS FOR THE PRODUCTION OF A CRIMPED CONTINUOUS MULTIFILAMENT YARN

[75] Inventor: Eberhard Krenzer, Ennepetal-Rüggeberg, Fed. Rep. of Germany

[73] Assignee: Barmag Barmer Maschinenfabrik Aktiengesellschaft, Remscheid-Lennep, Fed. Rep. of Germany

[21] Appl. No.: 629,268

[22] Filed: Jul. 10, 1984

Related U.S. Patent Documents

Reissue of:

[64] Patent No.: 4,338,776
Issued: Jul. 13, 1982
Appl. No.: 958,644
Filed: Nov. 8, 1978

[30] Foreign Application Priority Data

Nov. 8, 1977 [DE] Fed. Rep. of Germany ..... 2749867
Dec. 8, 1977 [CH] Switzerland ..... 014981/77

[51] Int. Cl.[4] ..... D02G 1/16; D02G 1/20

[52] U.S. Cl. ..... 57/246; 28/271; 28/281; 57/239; 57/350

[58] Field of Search ..... 57/239, 245, 246, 350, 57/351, 309; 28/220, 258, 271-273, 281

[56] References Cited

U.S. PATENT DOCUMENTS

| | | | |
|---|---|---|---|
| 2,852,906 | 9/1958 | Breen | 57/246 X |
| 2,962,794 | 12/1960 | Field, Jr. | 57/309 X |
| 3,448,501 | 6/1969 | Buzano | 28/271 |
| 3,543,358 | 12/1970 | Breen et al. | 28/271 X |
| 3,831,231 | 8/1974 | Binford et al. | 28/271 X |
| 3,854,177 | 12/1974 | Breen et al. | 28/273 X |
| 3,892,020 | 7/1975 | Koslowski | 28/273 X |
| 4,000,551 | 1/1977 | Holden | 28/271 |

FOREIGN PATENT DOCUMENTS 17627 5/1974 Japan .

*Primary Examiner*—John Petrakes
*Attorney, Agent, or Firm*—Bell, Seltzer, Park & Gibson

[57] ABSTRACT

Process and apparatus for producing a crimped continuous multifilament yarn by the sequential steps of air-jet texturizing to form multiple random filamentary loops, immediately pulling out metastable loops formed in the yarn without heating and without stretching or deforming the yarn filaments, next shrinking and heat setting the yarn at a temperature of about 150°-245° C., and then winding the yarn onto a spool at a predetermined yarn tension. The resulting spooled texturized yarn has valuable properties and characteristics in subsequent processing and textile operations.

22 Claims, No Drawings

PROCESS FOR THE PRODUCTION OF A CRIMPED CONTINUOUS MULTIFILAMENT YARN

Matter enclosed in heavy brackets [ ] appears in the original patent but forms no part of this reissue specification; matter printed in italics indicates the additions made by reissue.

BACKGROUND OF THE INVENTION

The invention relates to a method and apparatus for producing crimped yarns composed of continuous synthetic fiber-forming polymeric filaments, especially polyethylene terephthalate filaments, wherein the yarn is guided between a first and a second set of feed and draw rolls or similar independently driven delivery systems, so that the yarn passes with overfeed through a texturing nozzle operating according to the air-jet or air-bulking principle to produce a large number of random loops or crimps in the individual filaments. Other than the selection of particular filaments, the type and degree of texturizing or bulking depends largely upon the amount of twist in the initial yarn and the amount of overfeed through the texturizing jet. The resulting texturized yarn is then directly spooled, usually under a high uniform tension. The resulting yarn product is characterized by a poor linear stabiity and very high boiling shrinkage values.

A general description of the air-jet texturizing process can be found in such texts as "Woven Stretch and Textured Fabrics", by B. L. Hathorne, Interscience Publishers, John Wiley & Sons, N.Y., Chapter 6, pages 104–117 (1964). More particularly, attention is directed to the Breen patents and especially U.S. Pat. Nos. 2,783,609 and 2,852,906 which are directed to the yarn product as well as the process and apparatus. The yarns produced in this way are especially characterized by the presence of many ring-like or crunodal loops irregularly spaced along the yarn surface although there is usually a substantial number of loops or crimps formed internally of the yarn as well.

A variation of this air-jet texturizing process has been disclosed by Field in U.S. Pat. No. 2,962,794 for the purpose of producing a jet texturized yarn which is highly bulky and which exhibits an extremely high extensibility under very slight tension, e.g. an extensibility of at least one fifth again and preferably one half again the unextended length of the yarn with recovery to at most the arithmetic mean of the extended and unextended lengths. This process and the resulting yarn product differ from the earlier Breen process and its product in that a relatively low twist yarn is subjected to relatively high overfeed in order to produce by the jet texturization a large number of so-called "meta-stable loops" which remain in the yarn at about zero tension but which are removed under a light to moderate tension. Field teaches a heat setting of these meta-stable loops into the yarn such that the end product is highly extensible due to the large extension and contraction of the preset loops.

From the Breen process and other previously known processes of this kind, i.e. for the air-jet texturizing of a continuous multifilament yarn, it has become evident that the texturized or bulked yarn product has only a slight or insubstantial stability. In order to measure the amount of stability of the yarn, it is usually determined by using a sample which has an initial length of one meter under a base load of about 1/100 grams per denier, subjecting this sample to a load of ⅓ grams per denier for 30 seconds and then, after relieving the texturized yarn again to the base load of 1/100 grams per denier for a period of 30 seconds, measuring the length of the yarn. The "instability" can be read immediately from a centimeter measuring stick as a percentage of the original length of the texturized yarn. Thus, the instability is measured as the percentage increase in the standard yarn length of one meter after a specified load applied for a specified time has been removed and the yarn permitted to return to its base load for a similar specified period of time.

Up to the present time, it has not been possible to achieve instabilities of less than 1% with such air-jet texturized yarns. Moreover, it has not been possible with such yarns to achieve smaller shrinkage values in connection with boiling. Hitherto, boiling shrinkage values have been more than 4%. Also, it has been previously necessary to respool the texturized yarn once again, first because the yarn spool produced directly in the texturizing operation exhibits such poor run-off properties that it is impossible to introduce these spools directly onto a knitting or weaving machine. In particular, frequent thread breakage is caused and represents a serious problem in using even tightly wound initial spools which have not been rewound. Likewise, respooling has been deemed necessary in order to produce low-shrinkage dyeing spools which, as is known, may only have slight thread or yarn tensions. Also, flat webs or sheets as finished articles produced from the known jet-texturized or air-bulked yarns are not only disadvantageous with respect to their inherent instability and their large boiling shrinkage, but are also disadvantageous due to a very noticeable "burr effect" which becomes apparent from the fact that the surfaces of the flat articles adhere to each other.

Another disadvantage of yarns produced according to the conventional air-jet texturing method is the nonuniformity of the crimping or looping effect. Previously, this lack of uniformity could only be partly reduced by providing the longest possible free running length of the yarn just before the final winding or spooling step.

SUMMARY OF THE INVENTION

It is an object of the present invention to provide a process for the jet-texturizing of a synthetic multifilament yarn and especially a polyester yarn which will avoid the disadvantages of the prior art processes while permitting the yarn to be conducted through a number of sequential treatment stages which can be made relatively independent of one another in such a way that, in each stage of the process, the required parameters or treatment conditions can be optimally selected without making a compromise as between the functions of each individual stage, i.e. so that one stage does not have an undesirable influence on the other stages.

It has now been found that highly improved results can be achieved in the generally known air-bulking or jet-texturizing of a multifilament yarn provided that the following independent steps or stages are carried out in sequence:

(a) conducting the initial non-crimped multifilament yarn through an air-jet texturizing nozzle at an overfeed rate which is sufficient to form multiple random loops in the individual filaments including a minor proportion of metastable loops;

(b) conducting the yarn immediately after it has left the texturizing zone or stage between two delivery systems, e.g. feed and draw rolls, with a run-out speed greater than the run-in speed such that metastable loops are pulled out of the yarn under heat-free conditions such that metastable loops are pulled out of the yarn without causing any elastic or plastic deformation of the individual filaments, thereby providing a stabilizing stage or zone in which a predominant number up to almost all of the metastable loops are eliminated or at least pulled out to a stable position;

(c) then conducting the stabilized yarn by means of yet another delivery system which has a run-out speed which allows a shrinkage of the yarn by a predetermined amount with the yarn passing through a setting zone where it is subjected to a shrinking treatment and heat treatment at temperatures of from 150° C. up to about 245° C.; and (d) thereafter winding the yarn onto a spool at a predetermined yarn tension and at a winding speed less than the speed of the yarn into the air-jet texturizing nozzle.

The process of the invention is thus characterized by four distinct operating stages or zones, namely; (1) a texturizing zone provided by an air-jet texturizing nozzle arranged between a first and second yarn delivery system operating at an overfeed rate corresponding to a circumferential speed $V_2$ of the second delivery system which is less than the circumferential speed $V_1$ of the first delivery system; (2) a heat-free stabilizing zone in which the yarn preferably runs free to a separate third delivery system over an unheated interval from said second delivery system with the run-out speed $V_3$ of the third delivery system being greater than the run-in speed $V_2$ so that the unstable or so-called metastable loops are carefully pulled out of the yarn under controlled conditions which prevent elastic or plastic filamentary distortion; (3) a setting zone through which the yarn is conducted by means of a separate fourth delivery system having a run-out circumferential speed $V_4$ which allows for a shrinkage of the yarn, the yarn in this setting zone being conducted under applied heat at temperatures of about 150°–245° C. to cause both shrinkage and a heat-setting of the stabilized yarn; and then (4) a take-up stage or zone after said shrinkage where the yarn is wound onto a take-up spool, bobbin or the like at a winding speed $V_5$ which is less than $V_1$. Especially preferred features of the process are disclosed more fully hereinafter and in the accompanying claims. The yarn product obtained by this process is especially characterized by a boiling shrinkage of less than 3.3% and an instability of less than 1.0%, measured in the manner mentioned above.

The process of the invention is especially useful with a multifilament yarn of a polyethylene terephthalate which has been spun at a spinning speed of more than 2,500 meters per minute and subsequently stretched in a feed to draw ratio of 1:1.2 to 1:2 before being introduced into the air-jet texturizing zone, thereby providing a continuous spinning, stretching and air-jet texturizing at relatively high speeds directly into a spooled product that is ready for use in all subsequent textile operations required of a produced spool package.

Apparatus for the invention closely follows the above named four essential zones or stages of the process so as to essentially include: a first and second yarn delivery means having an air-jet texturizing nozzle arranged therebetween; a third yarn delivery means to receive yarn from the second yarn delivery means at a spaced interval sufficient to provide a heat-free stabilizing zone and preferably including control means to variably operate said third delivery means at a run-out speed from the stabilizing zone of about 2 to 30% and most preferably about 2 to 15% greater than the run-in speed to said stabilizing zone; a heating means for shrinkage and setting of the yarn following the third yarn delivery means; and winding means to collect and preferably spool the resulting texturized yarn product at a controlled yarn tension. A conventional draw means is advantageously arranged directly before the first yarn delivery means in order to stretch melt-spun synthetic fiber-forming continuous filaments. The stretching of freshly melt-spun filaments can thus be accomplished by providing as the draw means the first yarn delivery means coupled with a yarn feed means operable at a run-in speed lower than the run-out speed of said first yarn delivery means. The specific types of apparatus useful in the present invention are essentially dictated by the process stages or zones which follow one another in sequence so that one skilled in this art can readily select the needed apparatus once the process is defined.

DETAILED DESCRIPTION OF THE INVENTION

The invention has four stages or zones required for texturizing, stabilizing, shrinking and heat-setting, and finally winding or spooling the finished yarn product.

The invention is hereinafter described with reference to a number of working examples to illustrate the preferred embodiments as found in the production of an air-jet texturized polyester yarn.

Apparatus for the invention includes the sequential arrangement of four delivery means which may be in the form of paired rollers, godets or other suitable yarn conducting means followed by a winding means or take-up spool, all being positively driven at controlled speeds as represented by circumferential speeds $V_1$, $V_2$, $V_3$, $V_4$ and $V_5$, respectively. A heater for the shrinking and heat-setting zone is located between the third and fourth delivery means. The corresponding yarn tensions $F_n$ can be designated as follows: $F_{St}$ for the stabilizing zone between the second and third delivery means; and $F_3$, $F_4$ and $F_5$ associated with the third and fourth delivery means and the take-up spool, respectively. The initial multifilament yarn or thread is supplied from a feed bobbin through a tensioning means or guide positioned just before the first roller or delivery means. Instead of this feed bobbin, the feed yarn can be directly supplied from a conventional melt-spinning unit and a yarn stretching means such as conventional feed and draw rolls wherein the first delivery means may take the place of the draw rolls.

Following the first delivery means, the yarn passes through a liquid bath and then into an air-jet texturizer of conventional construction such as that illustrated in the early Breen patents discussed hereinabove, it being understood that there are many variations and specific improvements of such texturizers which may also be readily adopted for purposes of the present invention.

In the texturizing zone between the second and third delivery means, the yarn is overfed to permit air-bulking in the texturizer with substantially no tension being exerted on the yarn as it runs out of the texturizer into the stabilizing zone maintained over a heat-free interval between the second and third delivery means. It is essential to operate third delivery means at a speed $V_3$ which is just sufficiently greater than the run-in speed $V_2$ so as to pull out the so-called metastable loops without actually stretching or elastically or plastically deforming the individual yarn filaments. Because the metastable loops can be pulled out at a relatively low tension, e.g. a tension $F_{St}$ can be used which is below about 20 cN and preferably below about 15 cN, as shown in the following examples, using the International System of units where "cN" is the abbreviation for centinewton or $10^{-2}$Newtons. On the other hand, the tension must be sufficiently high in the stabilizing zone to produce a final yarn product with a boiling shrinkage below about 3.3% and an instability of less than 1.0%, measured as defined above. For any given filamentary yarn, this tension $F_{St}$ must be maintained within narrow limits, preferably less than about 0.15 cN/dtex but higher than a minimum value of about 0.025 cN/dtex. The required tension can be readily determined by a few preliminary tests in order to preset the speeds $V_2$ and $V_3$, or else conventional control means can be used to adjust the speed ratio $V_3$:$V_2$ in response to the tension measured by a tensiometer between the second and third delivery means. It is a special advantage of the present invention that this critical and essential tension in the stabilizing zone can be set and maintained independently of the optimum conditions in each of the other stages or zones of the overall process.

In Examples I to VII as set forth in the Table which follows, the yarn employed was a polyethylene terephthalate yarn of 167 dtex f68. It can be inferred from Examples I and IV of this Table that the run-out speed $V_3$ from the stabilizing zone is at least 2% greater than the run-in speed $V_2$ in every case, and this drafting velocity is also limited in that the winding speed $V_5$ should not exceed the speed $V_2$ at which the yarn leaves the texturizing zone. The optimum overdraft or pull out percentage, as represented by the expression $(V_3-V_2)/(V_2)\times 100$, is necessarily dependent upon the composition and properties of the particular yarn filaments and especially its pretreatment in the texturizing zone. In general, an overdraft of about 2 to 8% is especially preferred.

Example V shows that while an excessive overdraft in the stabilizing zone still provides good values of the amount of instability, the crimping of looped texturizing previously introduced into the yarn is damaged so badly that the yarn is no longer usable.

Example VI illustrates that one can achieve a good linear stability of the yarn without using any stabilizing zone by adopting the most appropriate operating parameters in the setting zone and in the final winding or take-up zone. In this case, however, one must accept a considerable increase in the boiling shrinkage.

Example VII is another comparative example to show that the combination of the stabilizing zone and the heating zone is required to achieve the unique and advantageous results of the present invention.

The overdraft to be applied in the stabilizing zone can be determined in advance by applying a load to a standard one meter length of a sample of the texturized yarn, this load being selected so as to substantially completely pull out the unstable or metastable loops but without stretching or plastically deforming the unheated yarn. It is thus preferable to remove substantially all of the metastable loops. For example, a yarn texturized under the conditions of Example I, having a length of 1 meter under a base load of 0.01 g/denier, was subjected to a light load of 0.3 g/denier. The resulting change in length due to this latter loading over the base load length of 1 meter, expressed as a percentage, is the upper and preferred limit of the overdraft of the yarn in the stabilizing zone of Examples II to V.

The following Table of Examples should be considered together with the numerical designations given above to identify the various velocities and tension values

TABLE

| Example | $V_1$ | $V_2$ | $F_{St}$ | $V_{St}$ | $V_3$ | $F_3$ | $F_4$ | $V_4$ | $F_5$ | $V_5$ | Inst. | KS |
|---|---|---|---|---|---|---|---|---|---|---|---|---|
| I | 625 | 500 | — | 0 | — | 2 | 5 | 471 | 15 | 498 | 1.6 | 3.5 |
| II | 625 | 500 | 8 | 1 | 505 | 3 | 8 | 476 | 15 | 487 | 1.3 | 4.2 |
| III | 625 | 500 | 10 | 4 | 520 | 3 | 7 | 490 | 24 | 495 | 0.4 | 3 |
| IV | 625 | 500 | 14 | 6 | 530 | 3 | 7 | 499 | 17 | 502 | 0.7 | 3 |
| V | 625 | 500 | 30 | 10 | 553 | 4 | 7 | 493 | Insufficient crimping, not usable. | | | |
| VI | 625 | 500 | — | 0 | — | 8 | 79 | 508 | 20 | 503 | 1.0 | 4.2 |
| VII | 625 | 500 | 10 | 4 | 520 | — | — | 0 | 8 | 525 | 0.9 | 10 |

$V_n$ represents yarn velocity (m/min)
$F_n$ represents yarn tension (cN)
$F_{St}$ represents yarn tension in the stabilizing zone (cN)
$V_{St}$ represents overdraw in the stabilizing zone (%)
Inst. represents Instability (%)
KS represents Boiling Shrinkage In addition to the tabulated Examples, tests were also run to show that neither the stabilizing zone nor the setting zone, operated alone, will lead to the results achieved by the combination of both zones according to the invention. In one set of tests, samples were taken at different points in the process as follows:

Sample 1—from the take-up spool;

Sample 2—between the third delivery means and the heater;

Sample 3—just behind, i.e. immediately following the second delivery means in the direction of yarn travel; and Sample 4—just behind the fourth delivery means in the direction of yarn travel.

The height and width of the loops appearing in these samples were then measured, as an average value in microns, with the following results:

| Sample | Height | Width |
|---|---|---|
| 1 | 32.7 | 21.3 |
| 2 | 83.3 | 44.7 |
| 3 | 78.7 | 42.7 |
| 4 | 26.8 | 22.7 |

Such results prove that only by using a combination of the stabilizing and heating zones does it become possible to reduce the loops to less than one-half with respect to both height and width. If the heating zone is used without the stabilizing zone of the present invention, then the yarn was observed as being nonuniform and of poor quality, especially because of an uneven distribution of loops and flat portions over the length of the yarn.

It should be noted that the shrinkage and setting treatment of third stage has an essential purpose or function of modifying and improving the shrinkage properties so that the yarn is more useful in a large number of final textile products where shrinkage must be avoided. Package dyeing is also improved with such low shrinkage values. The optimum modifying treatment in the shrinking and setting zone depends upon the type of yarn, i.e. the polymer used, denier, fiber properties and the desired characteristics of the final yarn. In general, it has been found that the run-out speed from the shrinking and setting zone is normally selected to be smaller than the run-in speed $V_3$. Good yarn properties can be achieved, for example, if the run-out speed $V_4$ is approximately 2 to 10% less than the run-in speed $V_3$. As shown in the Examples, yarns with a size of 167 dtex exhibited advantageous characteristics if the run-out speed of the setting zone was less than the run-in speed to the stabilizing zone.

In certain instances, especially for nylon and polyester yarns of more than 700 dtex, the shrinkage properties of the texturized yarn are preferably modified by a heat treatment with the run-out speed $V_4$ from the setting zone being about equal to or only up to 2% higher than the run-in speed to the same zone.

The principal advantage and improvement of the process and corresponding apparatus of the invention arises out of the discovery that the quality and usefulness of the jet-texturized yarn improves significantly by the addition of a separate stabilizing zone between the texturizing zone and a heat-setting zone. With respect to the apparatus, this modification of the process requires only the addition of an additional set of delivery rolls or similar yarn conducting or delivery means and a generally known tubular heating means to provide the essential shrinking and setting of the yarn following the stabilizing zone. As a result of this simple but significant change in the air-jet texturizing process, it becomes possible to carry out both the setting and winding operations under optimum conditions of speed and tension.

The exact length of the stabilizing zone is not critical but it should be sufficiently long to achieve a uniform pulling out of the metastable loops, i.e. so that the overdraft is uniformly integrated or equalized over the yarn length without causing local elastic or plastic deformation of filaments. The term "elastic deformation" refers to an elongation of a filament which may then substantially recover to its original length. The expression "plastic deformation" refers to a stretching of the filament to the point where it is permanently elongated and has its fiber properties markedly changed if not completely damaged. Such deformations must be avoided in pulling out the metastable loops in the stabilizing zone of the present invention.

The preferred velocity or yarn speed relationships with reference to each other at various points in the process are set forth by the claims below and are incorporated here by reference. The preferred polyester yarn (polyethylene terephthalate) is one with a yarn size on the order of magnitude of about 167 to 267 dtex.

Especially valuable yarns are obtained according to the present invention by bringing together individual yarns from identical texturizing and stabilizing zones and combining them into a two-ply or three-ply yarn with an identical shrinking and heat treatment of the individual yarns. These plied yarns have the same improved stability and low boiling shrinkage as the single ply yarns and provide a very high quality fabric or webbing as a final textile product.

With the yarns produced according to the present invention, linear stability is increased substantially, the boiling shrinkage and the burr effect are both greatly reduced and the overhead unwinding or run-off from a spool or bobbin package is improved to such an extent that it becomes possible to produce direct windings after air-jet texturizing into a spool package which are immediately useful for spinning, weaving or knitting operations with delivery times of several hours and free of thread breakages. No irregularity has been detected in the crimping or texturized looping of the yarns produced by the process of this invention, even though there is a much shorter running length from the fourth delivery system and the winding spool. It should be noted as a particular advantage that the form of the yarn with respect to the frequency and appearance of the loops is already determined along with the physical or structural properties of the yarn prior to the heat treatment so that this loop configuration of the yarn is not substantially modified other than to pull out metastable loops. The variation in bulking or hiding power is of less importance where, as here, the stability and shrinkage properties represent a substantial advance in this art.

The invention is hereby claimed as follows:

1. A process for the production of a linearly stable, crimped continuous multifilament yarn which comprises:

guiding the initial non-crimped multifilament yarn between a first and second delivery system through an air-jet texturizing nozzle as a texturizing zone at *a temperature insufficient to heat set the yarn and at* an overfeed rate corresponding to a circumferential speed $V_2$ of the second delivery system which is less than the circumferential speed $V_1$ of the first delivery system, thereby forming multiple random loops in the individual filaments including a minor proportion of metastable loops;

*eliminating or at least pulling out to a stable position a predominant number of said metastable loops without removing the other random loops and without any elastic or plastic deformation of the individual filaments by* conducting the yarn immediately after it has left the texturizing zone into a heat-free stabilizing zone by means of a third delivery system having a run-out speed $V_3$ greater than the run-in speed $V_2$ of the second delivery system [, such that metastable loops are pulled out of the yarn without causing any elastic or plastic deformation of the individual filaments];

then conducting the stabilized yarn into a setting zone by means of a fourth delivery system having a run-out circumferential speed $V_4$ which allows a *controlled* shrinkage of the yarn to a predetermined amount, the yarn in said setting zone being subjected to a shrinking treatment and heat treatment at temperatures from 150° C. up to about 245° C.; and winding the yarn after said shrinkage onto a spool at a predetermined yarn tension and at a winding speed $V_5$ which is less than $V_1$.

2. A process as claimed in claim 1 wherein the run-out speed $V_3$ from the stabilizing zone is less than the run-in speed $V_1$ into the texturizing zone.

3. A process as claimed in claim 1 wherein the winding speed $V_5$ is less than $V_2$.

4. A process as claimed in claim 1 wherein the run-in speed $V_1$ into the texturizing zone is up to 300% greater than the run-out speed $V_2$ from said texturizing zone.

5. A process as claimed in claim 1 wherein the run-in speed $V_1$ into the texturizing zone is up to 25% greater than the run-out speed $V_2$ from said texturizing zone.

6. A process as claimed in claim 1 wherein the run-out speed $V_3$ from the stabilizing zone is 2 to 30% greater than the run-in speed $V_2$ into said stabilizing zone.

7. A process as claimed in claim 1 wherein the run-out speed $V_3$ from the stabilizing zone is 2 to 15% greater than the run-in speed $V_2$ into said stabilizing zone.

8. A process as claimed in claims 1, 6 or 7 wherein the run-out speed $V_4$ of the setting zone is about 2 to 10% less than the run-out speed $V_3$ of the stabilizing zone.

9. A process as claimed in claim 1 wherein the run-out speed $V_4$ of the setting zone is less than the run-in speed $V_3$ of said setting zone.

10. A process as claimed in claim 9 for producing a low shrinkage yarn having a linear density higher than 70 dtex wherein the run-out speed $V_4$ of the setting zone is less than the run-in speed $V_2$ of the stabilizing zone.

11. A process as claimed in claim 1 wherein the winding speed $V_5$ is approximately equal to the run-out speed $V_4$ of the setting zone but less than the run-out speed $V_3$ of the stabilizing zone.

12. A process as claimed in claim 1 wherein the pulling out of the yarn in the stabilizing zone is less than the change in length of the same yarn if it were to be subjected to the shrinking and heat treatment immediately after the texturizing zone and then subjected to a weight load of 0.3 g/den for 30 seconds duration.

13. A process as claimed in claim 1 wherein the yarn being used is a multifilament yarn of polyethylene terephthalate.

14. A process as claimed in claim 1 wherein the yarn being used is a multifilament yarn of polyethylene terephthalate which has been spun at a spinning speed of more than 2,500 m/min and subsequently stretched in the ratio of 1:1.2 to 1:2 before being introduced into the texturizing zone.

15. A process as claimed in claims 13 of 14 wherein the yarn has a linear density on the order of 167 dtex.

16. A process as claimed in claims 13 or 14 wherein the yarn has a linear density on the order of 267 dtex.

17. A process as claimed in claim 1 wherein a number of yarns from identical texturizing and stabilizing zones are combined into a two-ply or three-ply yarn with an identical shrinking and heat treatment of the individual yarns.

18. The air-jet texturized and linearly stabilized yarn product obtained by the process of claim 1, said yarn product having a boiling shrinkage of less than 3.3% and an instability of less than 1.0%, measured as the percentage increase in yarn length of a sample having an initial length of one meter under a base load of 1/100 g/den after being subjected to a load of ⅓ g/den for 30 seconds and then relieved again to the base load of 1/100 g/den for another 30 seconds.

19. The yarn product as claimed in claim 18 wherein two or three identically texturized and stabilized yarns are combined into a corresponding three ply yarn with all of the individual yarns having been subjected to an identical shrinking and heat treatment.

20. The yarn product as claimed in claims 18 or 19 wherein each individual yarn is a multifilament polyethylene terephthalate yarn.

21. The yarn product as claimed in claim 18 wound onto said spool after said shrinkage at a predetermined yarn tension and sufficiently stabilized to provide run-off properties permitting the spool to be introduced directly onto a knitting or weaving machine without respooling.

22. The spooled yarn product of claim 21 wherein the yarn is a multifilament polyethylene terephthalate yarn.

* * * * *